May 15, 1928. 1,670,167
J. A. REECE
METHOD AND APPARATUS FOR PRODUCING SHEETS FROM GLASS UNDER PRESSURE
Filed Jan. 30, 1925

INVENTOR.
Joseph A. Reece.
Frank Fraser
ATTORNEY.

Patented May 15, 1928.

1,670,167

UNITED STATES PATENT OFFICE.

JOSEPH A. REECE, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR PRODUCING SHEETS FROM GLASS UNDER PRESSURE.

Application filed January 30, 1925. Serial No. 5,713.

The present invention relates to sheet glass apparatus, and has particular reference to an apparatus wherein a sheet is continuously drawn from an relatively restricted pool.

An important object of the invention is to provide a sheet glass apparatus wherein a floating pool is created upon a mass of molten glass, said pool being replenished from substratum glass from the mass, and includes means for drawing a sheet from the said pool.

A further object of the invention is to provide sheet glass drawing apparatus wherein a deputer is partially submerged in a mass of molten glass in a maner that a pool of glass is formed in said deputer from which a sheet of glass may be drawn.

A still further object of the invention is to provide a sheet glass apparatus wherein a deputer is partially submerged in a mass of molten glass in a manner that a pool of glass is formed therein, said pool being under pressure and having communication with the mass so that it can be constantly replenished, said deputer having associated therewith means for heating the same to properly condition the glass, and means for continuously drawing a sheet from said pool.

Other objects and advantages of the invention will become apparent during the course of the following description.

Figure 1:
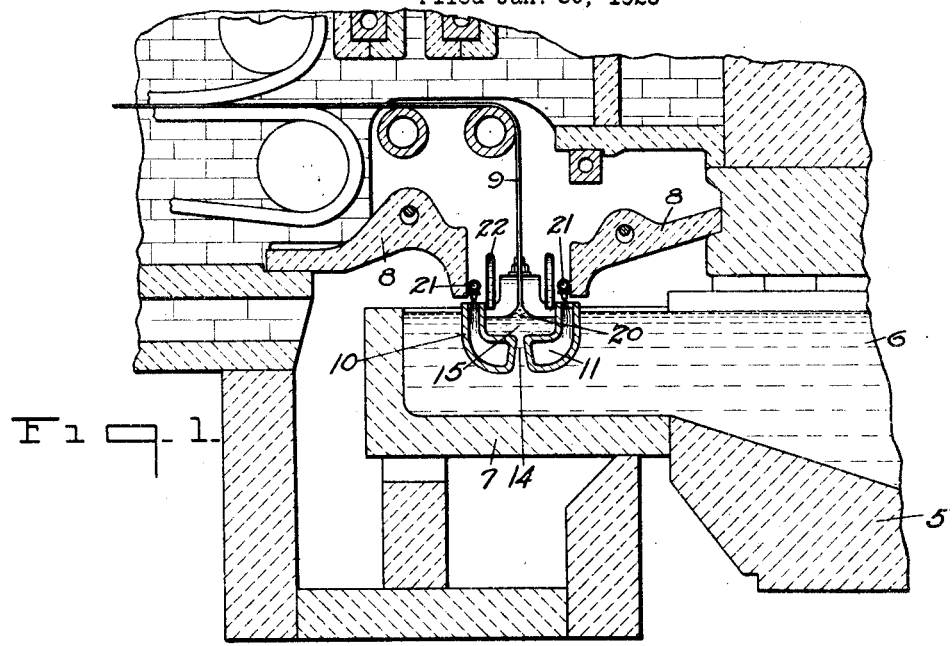
Figure 2:
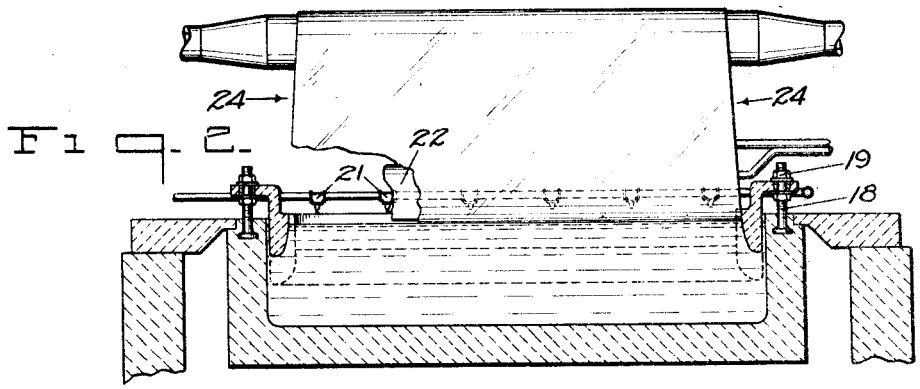
Figure 3:
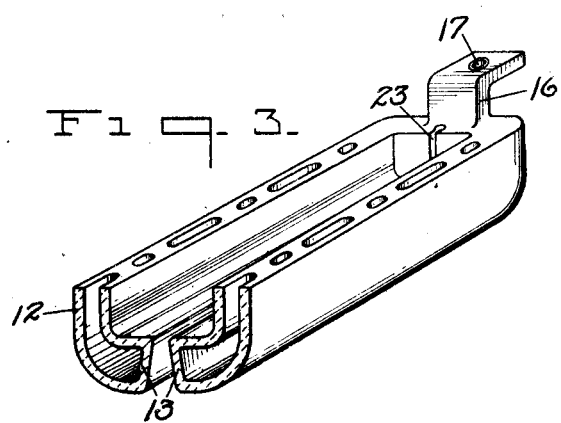

In the drawings wherein like numerals are employed to designate like parts throughout the same, Fig. 1 is a fragmentary vertical longitudinal section through my improved construction, Fig. 2 is a fragmentary vertical transverse section thereof, and Fig. 8 is a fragmentary perspective view of one form of deputer which may be used in accordance with the present invention.

It is to be understood that my invention is not restricted to the type of machine disclosed in the drawings wherein the sheet is deflected from a vertical to a horizontal plane, as the same construction can be used in vertical type machines, etc.

In the apparatus disclosed a tank furnace 5, having a mass of molten glass 6 therein, is in open communication with a pot 7. Arranged above the pot 7 are cover-tiles 8 which prevent heat currents from striking the sheet 9 which is being drawn.

The numeral 10 designates a deputer which may be formed from a refractory clay or some suitable heat-resisting non-corrosive alloy. The deputer 10 is preferably formed in an integral structure, and is provided with the internal chambers 11. The deputer 10 has the vertical side walls 12, and the inwardly extending flange portions 13 which form an elongated slot 14 which permits molten glass to flow from the mass 6 to within the said deputer. As is clearly shown in Fig. 1, the shape of the deputer is such that a so-called floating pool is formed therein from which the sheet 9 can be continuously drawn. Due to the slot 14, the floating pool 15 is continuously replenished from the mass 6. The slot 14 is preferably of such a width that the draw of the sheet 9 will be rapid enough to maintain the level of the floating pool 15 substantially lower than the level of the glass 6 in the pot 7, so that the floating pool will be under pressure, thus facilitating a rapid draw of sheet therefrom.

The deputer 10 is provided with the angular extensions 16 having an aperture 17 formed therein through which a screw-threaded shaft 18 may be run, thus permitting nuts or the like 19 being operated upon the shaft to raise or lower the said deputer. The depth of the pool 15 and the rapidity of draw can be determined somewhat by the depth of the deputer within the mass of glass 6.

To produce a pool 15 capable of forming a sheet source 20 of the desired temperature, heating means 21 are preferably arranged above the side walls of the deputer and are permitted to throw a flame down within the compartments 11 formed therein. This will prevent stagnation of the glass in and around the deputer, while at the same time it will prevent a reduction in temperature of the glass coming in contact with the deputer which ordinarily would be relatively cooler than the glass 6, and would possibly cause devitrification of the glass.

To facilitate drawing of a sheet from the pool 15, heat-absorbing means 22 are provided, and may be arranged any distance from the sheet 9 as desired.

The ends of the deputer are slotted as at 23, and are adapted to receive the edges 24 of the sheet being drawn in a manner that a drag will be created sufficient to build up an edge capable of maintaining the sheet to width after it is drawn from the pool 15.

With such a type of apparatus a floating pool can be created upon a mass of molten glass from which a sheet of glass can continuously be drawn. The advantages of such a construction reside in the fact that the sheet is formed from substratum glass, while at the same time lines or other surface defects will not be formed in the sheet.

Claims:

1. In combination, a receptacle containing a mass of molten glass, a container within the molten glass for segregating a pool of glass from said mass, means for drawing a sheet from said pool, said container having an opening in its bottom through which glass passes from said mass to said pool and being provided with internal chambers, cover-tiles arranged above the mass of molten glass at either side the container to protect the sheet being drawn, and a heating means above the container at each side of the sheet inwardly of said cover-tiles for directing a flame downwardly into the internal chambers of said container.

2. In combination, a receptacle containing a mass of molten glass, a container within the molten glass for segregating a pool of glass from said mass, means for drawing a sheet from said pool, said container having an opening in its bottom through which glass passes from said mass to said pool and being provided with internal chambers, cover-tiles arranged above the mass of molten glass at either side of the container to protect the sheet being drawn, a heating means above the container at each side of the sheet inwardly of the cover-tiles for directing a flame downwardly into the internal chambers of said container, and coolers arranged above the pool at opposite sides of the sheet and inwardly of the said heating means.

Signed at Toledo, in the county of Lucas and State of Ohio, this 27th day of January, 1925.

JOSEPH A. REECE.